United States Patent
Watanabe (10) Patent No.: US 10,242,438 B2
(45) Date of Patent: Mar. 26, 2019

(54) INFORMATION PROCESSING APPARATUS, CONTROL METHOD OF INFORMATION PROCESSING APPARATUS, AND STORAGE MEDIUM FOR IMAGE RECOGNITION OF THE ASSEMBLY OF AN OBJECT

(71) Applicant: CANON KABUSHIKI KAISHA, Tokyo (JP)

(72) Inventor: Daisuke Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 15/429,868

(22) Filed: Feb. 10, 2017

(65) Prior Publication Data
US 2017/0236268 A1    Aug. 17, 2017

(30) Foreign Application Priority Data
Feb. 15, 2016    (JP) ................. 2016-026347

(51) Int. Cl.
*G06K 9/00* (2006.01)
*G06T 7/00* (2017.01)
(Continued)

(52) U.S. Cl.
CPC ........ *G06T 7/0004* (2013.01); *G06K 9/00201* (2013.01); *G06K 9/4604* (2013.01);
(Continued)

(58) Field of Classification Search
CPC ............. G06T 7/75; G06T 2207/10028; G06T 2207/30164; G06T 7/0004; G06T 7/70;
(Continued)

(56) References Cited

U.S. PATENT DOCUMENTS

2011/0206274 A1*  8/2011  Tateno .................. G06T 7/75
                                          382/154
2012/0121135 A1*  5/2012  Kotake .................. G01S 5/163
                                          382/103
(Continued)

FOREIGN PATENT DOCUMENTS

JP          2015-114722 A    6/2015

OTHER PUBLICATIONS

R. Y. Tsai, "A versatile camera calibration technique for high-accuracy 3D machine vision metrology using off-the-shelf TV cameras and lenses", IEEE Journal of Robotics and Automation, vol. RA-3, No. 4, (1987), pp. 323-344.
(Continued)

*Primary Examiner* — Li Liu
(74) *Attorney, Agent, or Firm* — Carter, DeLuca & Farrell, LLP (57) ABSTRACT

An apparatus comprises an unit configured to obtain an image of an assembled object that is constituted by first and second objects that have been assembled; an unit configured to obtain a three-dimensional shape model of the assembled object that has at least one area to which an attribute that corresponds to the first object or the second object is added; an unit configured to obtain a position and orientation of the assembled object based on the image; an unit configured to obtain, from the three-dimensional shape model of the position and orientation, first and second evaluation values that are for evaluating a state of assembly in areas that correspond to the first and second objects; and an unit configured to determine whether or not the assembly was successful based on the first and second evaluation values.

11 Claims, 5 Drawing Sheets

(51) Int. Cl.
    *G06T 7/70*   (2017.01)
    *G06K 9/46*   (2006.01)
    *G06T 7/73*   (2017.01)

(52) U.S. Cl.
    CPC .............. *G06T 7/001* (2013.01); *G06T 7/70* (2017.01); *G06T 7/75* (2017.01); *G06T 2207/10012* (2013.01); *G06T 2207/30164* (2013.01)

(58) Field of Classification Search
    CPC ............ G06T 2200/04; G06K 9/00201; G06K 9/4604; G06K 9/52; G06K 9/6215
    See application file for complete search history.

(56) References Cited

U.S. PATENT DOCUMENTS

| | | | | |
|---|---|---|---|---|
| 2012/0262455 | A1* | 10/2012 | Watanabe | G06T 7/75 345/420 |
| 2013/0271577 | A1* | 10/2013 | Watanabe | H04N 13/0275 348/46 |
| 2014/0067126 | A1* | 3/2014 | Watanabe | B25J 9/1697 700/259 |
| 2014/0219502 | A1* | 8/2014 | Hirota | G01B 11/002 382/103 |
| 2015/0125034 | A1* | 5/2015 | Tateno | G06T 7/0046 382/103 |
| 2015/0160651 | A1* | 6/2015 | Tateno | G05B 19/406 700/110 |
| 2016/0267668 | A1* | 9/2016 | Yamada | G01B 11/2509 |
| 2017/0358048 | A1* | 12/2017 | Kotake | G06T 1/0007 |
| 2018/0029235 | A1* | 2/2018 | Linnell | B25J 9/1687 |

OTHER PUBLICATIONS

Tateno et al., "A Model Fitting Method Using Intensity and Range Images for Bin-Picking Applications", D, vol. J94-D (8), pp. 1410-1422, (2011).

* cited by examiner

INFORMATION PROCESSING APPARATUS, CONTROL METHOD OF INFORMATION PROCESSING APPARATUS, AND STORAGE MEDIUM FOR IMAGE RECOGNITION OF THE ASSEMBLY OF AN OBJECT

BACKGROUND OF THE INVENTION

Field of the Invention

The present invention relates to an information processing apparatus, a control method of the information processing apparatus, and a storage medium.

Description of the Related Art

With recent developments in robotics, complex tasks such as assembling industrial products are being performed by robots instead of humans. Such robots hold parts with an end effector such as a hand, and assemble the parts. In a part assembling operation by a robot, assembly may fail due to displacement that is caused when the hand holds a part, an abnormal part that is mixed in, or the like. Therefore, it is necessary to perform a post part-assembly test, in which whether or not assembly has been performed normally is checked.

Japanese Patent Laid-Open No. 2015-114722 discloses a method for performing a post-assembly test using a captured image of an assembled component that is constituted by two parts. The publication mentions a method for determining whether or not the assembly was successful using a three-dimensional shape model of the completely assembled component. In this method, the three-dimensional shape model of the assembled component is used to calculate position and orientation, and then whether or not the assembly was successful is determined based on a residual error in a target area between the three-dimensional shape model and the captured image.

In the method disclosed in Japanese Patent Laid-Open No. 2015-114722, it is necessary to appropriately set, as the target area, an area that has a large residual error from the captured image when the assembly was not successful. Here, if the position and orientation of the assembled component that is not correctly assembled are calculated, the residual error of an attachment part may be larger, or the residual error of an attachment destination part may be larger.

However, the dimensions and distribution of the residual errors may be affected by a difference in dimensions and shape of the two parts constituting the assembled component, the observation view point, or the like, and thus there is the problem that it is difficult to appropriately set a target area.

The present invention was made in view of the above-described problem, and provides a technique for improving the accuracy of determining whether or not assembly was successful, without setting a target area.

SUMMARY OF THE INVENTION

According to one aspect of the present invention, there is provided an information processing apparatus comprising: an image obtaining unit configured to obtain an image of an assembled object that is constituted by a first object and a second object that have been assembled; a model obtaining unit configured to obtain a three-dimensional shape model of the assembled object that has at least one area to which an attribute that corresponds to the first object or an attribute that corresponds to the second object is added; a position and orientation obtaining unit configured to obtain a position and orientation of the assembled object based on the image; an evaluation value obtaining unit configured to obtain, from the three-dimensional shape model of the position and orientation, a first evaluation value that is for evaluating a state of assembly in an area that corresponds to the first object, and a second evaluation value that is for evaluating a state of assembly in an area that corresponds to the second object; and a determination unit configured to determine whether or not the assembly was successful based on the first evaluation value and the second evaluation value.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 3A:
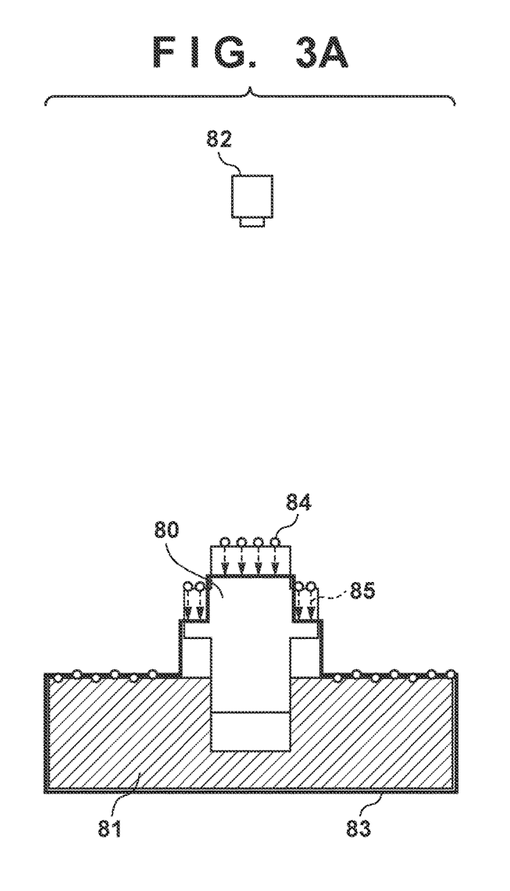
FIGS. 3A to 3B are diagrams illustrating residual errors.

The following will first describe residual errors with reference to FIGS. 3A and 3B. FIG. 3A shows a case where an attachment part 80 was not successfully attached, and the attachment part 80 is not fully fitted to an attachment destination part 81, and slightly protrudes therefrom. It is assumed here that a three-dimensional shape model 83 of an assembled component (assembled object) is arranged at a position and orientation that was calculated based on an image captured by an image capturing device 82, and whether or not assembly was successful is determined based on residual errors 85 in relation to three-dimensional points 84. In this case, the residual errors with respect to the attachment part 80 are large, and the residual errors with respect to the attachment destination part 81 are small.

Figure 3B:
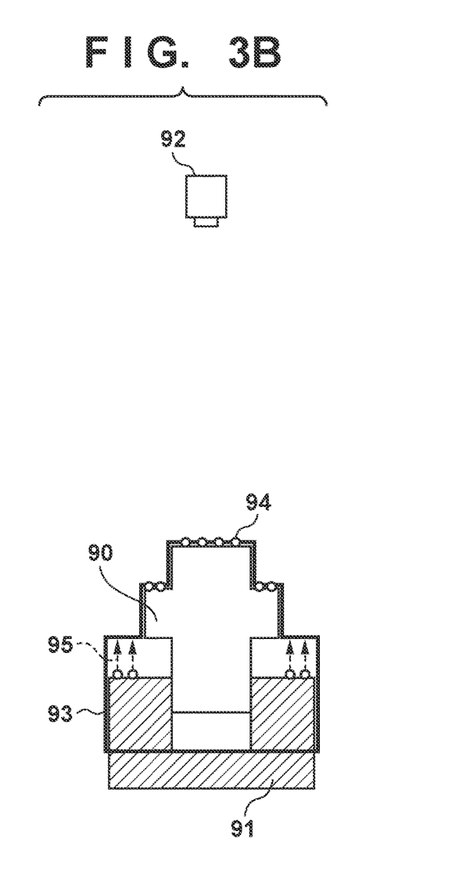

Similarly, FIG. 3B shows a case where an attachment part 90 was not successfully attached, and the attachment part 90 is not fully fitted to an attachment destination part 91, and slightly protrudes therefrom. It is assumed here that a three-dimensional shape model 93 of an assembled component is arranged at a position and orientation that was calculated based on an image captured by an image capturing device 92, and whether or not assembly was successful is determined based on residual errors 95 in relation to three-dimensional points 94. In this case, the residual errors with respect to the attachment destination part 91 are large, and the residual error with respect to the attachment part 90 are small.

In such cases, if an area that is to have a large residual error from the captured image of a failed assembly is not appropriately set as a target area, determination of whether or not assembly was successful is likely to be wrong. To avoid this, embodiments of the present invention provide a technique for improving the accuracy of determining whether or not assembly was successful without setting a target area.

First Embodiment

The present embodiment describes an example in which an attribute that corresponds to the attachment destination part or an attribute that corresponds to the attachment part is added to each area of a three-dimensional shape model of an assembled component, assembly evaluation values that correspond to the respective attributes are calculated, and it is determined whether or not the assembly was successful.

Figure 1A:
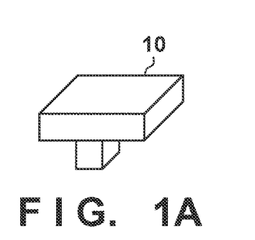
FIGS. 1A to 1D are diagrams illustrating examples of an attachment part and an attachment destination part according to a first embodiment.
Figure 1B:
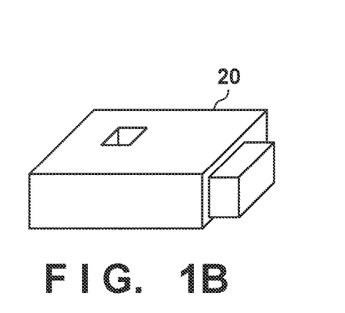
Figure 1C:
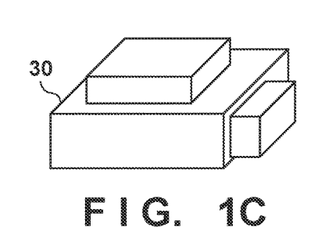
Figure 1D:
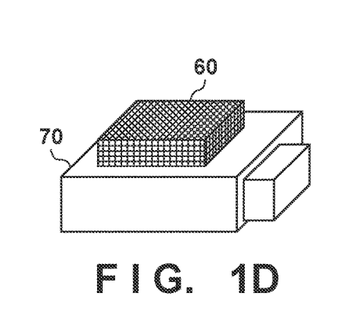

FIGS. 1A to 1D are diagrams illustrating examples of the attachment part and the attachment destination part according to the first embodiment. It is assumed that an assembled component 30 as shown in FIG. 1C is constituted by two parts, and is subjected to a post-assembly test. The assembled component 30 is constituted by an attachment part 10, as shown in FIG. 1A, that is held and moved by a robot hand, and an attachment destination part 20, as shown in FIG. 1B, that serves as a destination to which the attachment part 10 is attached. FIG. 1D will be described later.

Overview

"Post-assembly test" in the present embodiment refers to determining whether or not assembly was appropriately performed based on a captured image of the assembled component 30. Specifically, the position and orientation of the assembled component 30 is calculated based on the captured image of the assembled component 30, and it is determined whether or not assembly was successful based on a residual error between a three-dimensional shape model of the assembled component 30 and the captured image thereof, at the calculated position and orientation. Note that "position and orientation" of the present embodiment refers to the relationship of the positions and orientations between the attachment destination part 20 and the image capturing device that captures this part.

If the assembly was successful, the residual errors should be small in all areas of the three-dimensional shape model of the assembled component 30. In contrast, if the assembly was not successful, the residual errors with respect to the attachment part 10 may be large, or the residual errors with respect to the attachment destination part 20 may be large, as described above with reference to the example of FIGS. 3A and 3B. In either case, the residual error with respect to at least one of the parts should be large.

Accordingly, in the present embodiment, an attribute that corresponds to the attachment destination part 20 or an attribute that corresponds to the attachment part 10 is added to each area of the three-dimensional shape model of the assembled component 30. Then, residual errors for the areas that correspond to the attachment part 10, and residual errors for the areas that correspond to the attachment destination part 20 are calculated, and it is determined that the assembly was not successful if the residual error for at least one of the parts is equal to or larger than a predetermined value, and it is determined that the assembly was successful if the residual errors for both of the parts are less than the predetermined value.

Accordingly, it is possible to determine whether or not assembly was successful without setting a target area, the determination being unaffected by the relative dimensions, shapes, or observation view points of the two parts that constitute the assembled component 30, or the like.

The following will describe details of a method for performing a post-assembly test using a three-dimensional shape model of the assembled component 30 in which the attribute that corresponds to the attachment destination part 20 or the attribute that corresponds to the attachment part 10 is added to each of the areas constituting the three-dimensional shape model.

Configuration of Information Processing Apparatus

Figure 2:
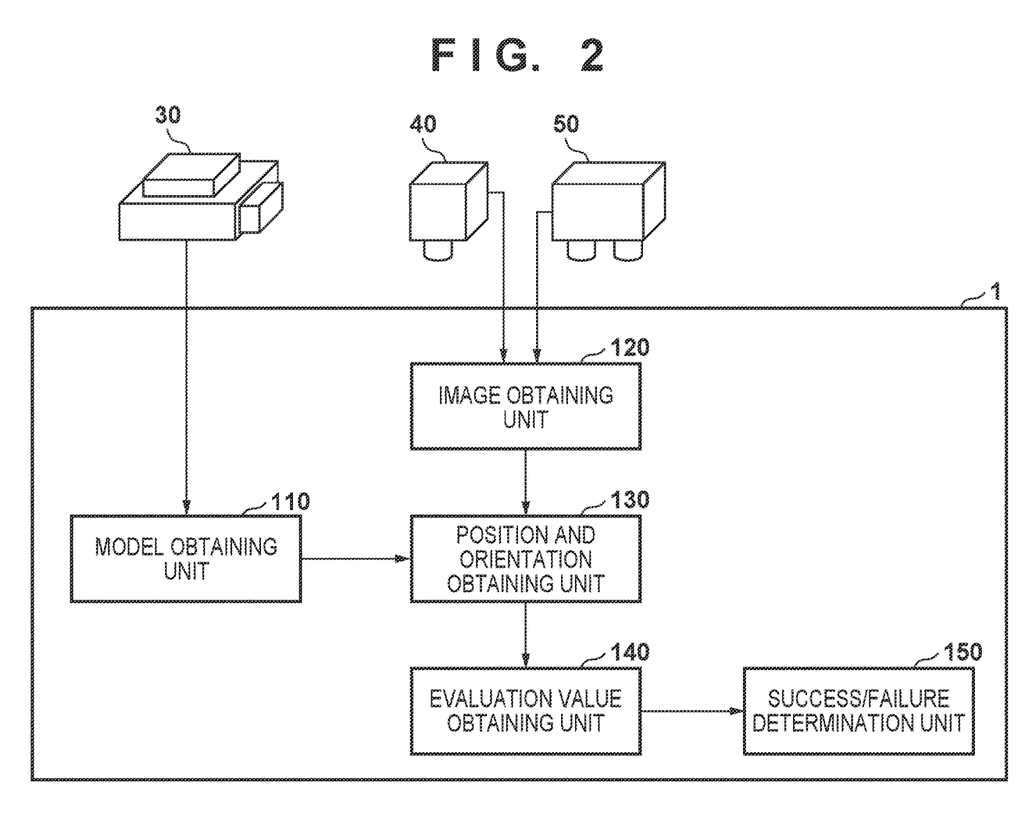
FIG. 2 is a diagram illustrating a configuration of an information processing apparatus according to the first embodiment.

The following will first describe an example of a configuration of an information processing apparatus 1 according to the present embodiment with reference to FIG. 2. The information processing apparatus 1 is provided with a model obtaining unit 110, an image obtaining unit 120, a position and orientation obtaining unit 130, an evaluation value obtaining unit 140, and a success/failure determination unit 150.

The model obtaining unit 110 obtains a three-dimensional shape model that expresses the shape of the assembled component 30. In the present embodiment, the three-dimensional shape model is constituted by information regarding local three-dimensional planes on the surface of an object (hereinafter, referred to as "local surface features"), which are constituted by three-dimensional positions and three-dimensional normal directions, and information regarding local three-dimensional line segments on the outline of the object (hereinafter, referred to as "local line features"), which are constituted by three-dimensional positions and three-dimensional line segment directions. Note that a simple "geometric feature" refers to either or both of the local surface features and the local line features.

Here, as shown in FIG. 1D, an attribute "area 60" that corresponds to the attachment part 10, or an attribute "area 70" that corresponds to the attachment destination part 20 is added in advance to the geometric features of the three-dimensional shape model of the assembled component 30. Accordingly, the local surface features and the local line features that belong to the attachment part 10 or the attachment destination part 20 can be referenced.

However, any shape information that is held by the three-dimensional shape model may be used as long as it is three-dimensional geometric information that expresses the target shape, and the present invention is not particularly limited to this expression mode. The shape information may be expressed in another expression mode, such as, for example, shape information of a set of simple three-dimensional points, a set of three-dimensional lines indicating ridge lines, and polygon shape information that is expressed as a set of a surface and lines that are made of three three-dimensional points. The three-dimensional shape model of the assembled component 30 is input to the position and orientation obtaining unit 130.

Note that in the present embodiment, the three-dimensional shape model of the assembled component 30 is described, taking a model constituted by the local surface features and the local line features as an example. However, the three-dimensional shape model may be expressed in another expression mode. For example, a three-dimensional shape model may be expressed as a set of polygons that are each constituted by three points, three sides, and one face, or a three-dimensional shape model may be expressed as a set of simple three-dimensional points. Alternatively, a method for parametrically expressing a three-dimensional shape model based on a combination of implicit functions may be used. The method for expressing a three-dimensional shape model is not particularly limited as long as the three-dimensional shape model matches the shape of the assembled component 30.

In FIG. 2, a two-dimensional image capturing device 40 is a camera that captures a two-dimensional image. The captured two-dimensional image may be a grayscale image or a color image. In the present embodiment, the two-dimensional image capturing device 40 outputs a grayscale image. The image that is captured by the two-dimensional image capturing device 40 is input to the information processing apparatus 1 via the image obtaining unit 120. Internal parameters of the camera such as "focal length", "position of the main point", and "lens distortion parameter" are calibrated in advance with reference to the specifications of the machine to be used, or by using the method disclosed in R. Y. Tsai, "A versatile camera calibration technique for high-accuracy 3D machine vision metrology using off-the-shelf TV cameras and lenses" IEEE Journal of Robotics and Automation, vol. RA-3, No. 4, 1987.

A range image capturing device 50 measures three-dimensional information of points on the surface of an object that serves as a measurement target. The range image capturing device 50 employs a range sensor that outputs a range image. The range image is an image whose pixels each have depth information. In the present embodiment, a one-shot active-type range sensor is used that emits, to a target object, a multi-slit line to which color IDs with different wavelengths are added, captures reflected light thereof using a camera, and performs distance measurement based on triangulation.

However, the range sensor is not limited to this, and may be a time-of-flight type range sensor that uses time-of-flight of light. Furthermore, the range sensor may be a passive-type range sensor that uses triangulation to calculate the depths of the respective pixels of an image captured by a stereo camera. In addition, the essence of the present invention is not impaired as long as a range sensor that measures a range image is used.

The range image obtained by the range image capturing device 50 is input to the information processing apparatus 1 via the image obtaining unit 120. Furthermore, it is assumed that the range image capturing device 50 and the two-dimensional image capturing device 40 have the same optical axis, and the correspondence relationship between the pixels of the grayscale image output by the two-dimensional image capturing device 40 and the pixels of the range image output by the range image capturing device 50 is known. However, the application of the present invention is not limited to the case where the grayscale image and the range image have the same view point.

For example, it is also possible that the image capturing device for capturing a grayscale image, and the image capturing device for capturing a range image are located at different positions and orientations, and capture a grayscale image and a range image from different view points. In this case, on the assumption that the relative positions and orientations between the image capturing devices are known, the correspondence between the grayscale image and the range image is obtained by projecting a three-dimensional point group in the range image onto the grayscale image.

The positional relationship between the image capturing devices is not particularly limited, as long as the relative positions and orientations between the image capturing devices that capture the same object are known, and the correspondence between these images can be calculated. Note that it is assumed that a coordinate system is set in common for the two-dimensional image capturing device 40 and the range image capturing device 50. Hereinafter, this coordinate system is referred to as "image capturing device coordinate system".

The position and orientation obtaining unit 130 calculates the position and orientation, relative to the image capturing device coordinate system, of the assembled component 30 based on the grayscale image and the range image that were captured by the two-dimensional image capturing device 40 and the range image capturing device 50, and the three-dimensional shape model of the assembled component 30 that was obtained by the model obtaining unit 110. The processing will be described in detail later.

Note that the present embodiment describes an example in which a grayscale image and a range image are used at the same time to calculate the position and orientation, but the present invention is also applicable to a case where only a grayscale image or a range image is used to estimate the position and orientation.

Based on the position and orientation information that was calculated by the position and orientation obtaining unit 130, and the three-dimensional shape model of the assembled component 30, the evaluation value obtaining unit 140 references the attributes added to the three-dimensional shape model, and calculates and obtains assembly evaluation values for the attachment part 10 and the attachment destination part 20. In the present embodiment, local surface features that have the same attribute are extracted from the three-dimensional shape model of the assembled component 30, three-dimensional points obtained from a range image and the local surface features closest to the three-dimensional points are paired, and the three-dimensional distances between the local surface features and the three-dimensional points are calculated as residual errors.

An average value of the residual errors obtained with respect to the local surface features of the same attribute is regarded as an assembly evaluation value for the part having this attribute. Note that a value calculated as an assembly evaluation value is not limited to one obtained by the above-described method, and may be any value as long as it is a value that increases or decreases depending on the magnitude of a spatial displacement between the assembled component 30 and the captured image, and the present invention is not particularly limited to a calculation method and expression method. For example, if a three-dimensional shape model is expressed by a polygonal model, distances from a triangular mesh and three-dimensional points that constitute the polygonal model may be regarded as assembly evaluation values.

Although, here, an example has been described in which a three-dimensional distance relating to a target area of a three-dimensional shape model is calculated as an assembly evaluation value, another method may be used to calculate an assembly evaluation value. For example, differences between ideal values and observed values of relative positions and orientations of a three-dimensional shape model of the attachment part 10 and a three-dimensional shape model of the attachment destination part 20 may be used as assembly evaluation values, or assembly evaluation values may be calculated based on residual errors between the three-dimensional shape models and the captured image.

Any method may be used to calculate a value that serves as an assembly evaluation value, as long as the value varies according to a displacement amount of the portion in which the attachment part 10 and the attachment destination part 20 are assembled, and the present invention is not particularly limited.

The success/failure determination unit 150 determines whether or not the assembly was successful based on the obtained evaluation value for the attachment part 10 and the obtained evaluation value for the attachment destination part 20, the evaluation values being obtained by the evaluation value obtaining unit 140.

An example of a configuration of the information processing apparatus 1 has been described so far. Note that the information processing apparatus 1 includes a computer. The computer is provided with a main control unit such as a CPU, and storage units such as a read-only memory (ROM), a random-access memory (RAM), and a hard disk drive (HDD), and the like. The computer may be further provided with input and output units such as buttons, and a display or a touch panel, a communication unit such as a network card, and the like. Note that these components are connected to each other via a bus or the like, and are controlled by the main control unit reading and executing a program stored in the storage unit.

Processing of Information Processing Apparatus

Figure 4:
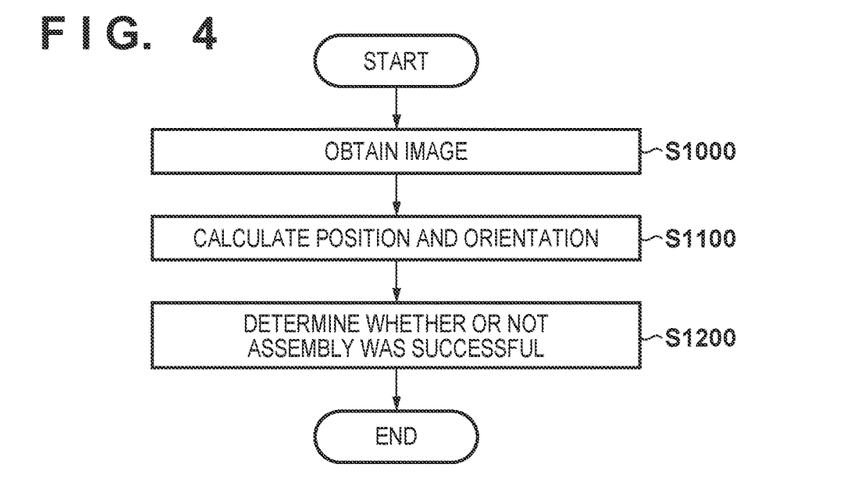
FIG. 4 is a flowchart illustrating a schematic procedure of processing for determining whether or not assembly was successful, the processing being executed by the information processing apparatus according to the first embodiment.

The following will describe a processing procedure for determining whether or not assembly was successful according to the present embodiment. FIG. 4 is a flowchart illustrating a procedure of the processing for determining whether or not the assembly was successful, the processing being executed by the information processing apparatus according to the present embodiment.

Step S1000

The image obtaining unit 120 obtains a grayscale image and a range image of a test target component constituted by two parts that have been assembled. First, the grayscale image is obtained from the two-dimensional image capturing device 40. Similarly, the range image is obtained from the range image capturing device 50. In the present embodiment, it is assumed that the range image includes the distance from the range image capturing device 50 to the surface of the measurement target object. Since, as described above, the two-dimensional image capturing device 40 and the range image capturing device 50 have the same optical axis, the correspondence between the pixels of the grayscale image and the pixels of the range image is known.

Step S1100

Then, in step S1100, the position and orientation obtaining unit 130 associates the grayscale image and the range image that were obtained in step S1000 with a three-dimensional shape model, and estimates positions and orientations of the attachment destination part 20 and the attachment part 10 based on results of the association. The following will describe the position and orientation estimating processing in step S1100 in detail with reference to the flowchart of FIG. 5.

Step S1110

Figure 5:
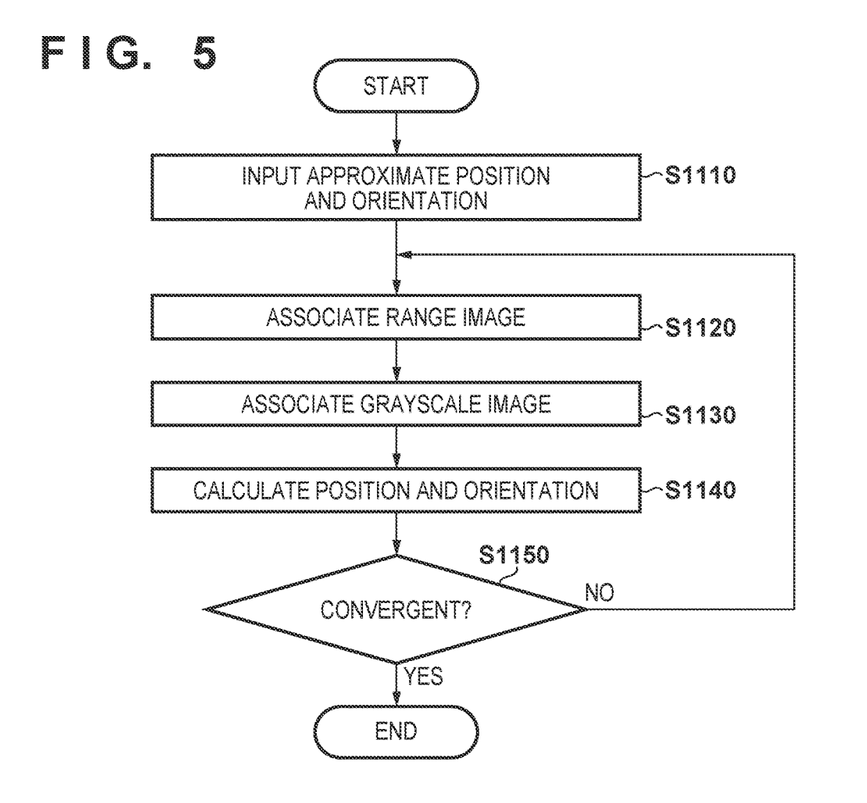
FIG. 5 is a flowchart illustrating a detailed procedure of processing for obtaining position and orientation, the processing being executed by the information processing apparatus according to the first embodiment.

First, the position and orientation obtaining unit 130 obtains an approximate value of the position and orientation of the assembled component 30 with respect to the image capturing devices, which are the two-dimensional image capturing device 40 and the range image capturing device 50. In the present embodiment, an approximate position and orientation of the target object that is known in advance is used as the approximate value.

However, the method for setting an approximate value of the position and orientation is not limited to this. For example, if the position and orientation obtaining unit 130 continuously performs the measurement in the time axis direction, a previously measured value (previous time) may be used as an approximate position and orientation. Alternatively, the speed or angular rate of the object is estimated using a time-series filter based on a result of the measurement with respect to a past position and orientation, and a current position and orientation that is predicted based on the past position and orientation and the estimated speed or angular rate may be used. Alternatively, images of the target object that were captured at various orientations are stored as a template, and an approximate position and orientation of the target object may be estimated by performing template matching on an input image.

Alternatively, if a position and orientation of an object can be measured by another sensor, an output value of the sensor may be used as an approximate value of the position and orientation. The sensor may be, for example, a magnetic sensor that measures position and orientation using a receiver that is mounted on the target object to detect a magnetic field emitted by a transmitter. Alternatively, the sensor may be an optical sensor that measures position and orientation using a camera, where the scene does not change, to capture a marker arranged on the target object. Any sensor may be used as long as it is a sensor that measures position and orientation in six degrees of freedom.

Step S1120

Then, based on the approximate position and orientation of the assembled component 30 that was obtained in step S1110, the position and orientation obtaining unit 130 associates the three-dimensional point group in the range image obtained in step S1000 with the three-dimensional shape model of the assembled component 30. Specifically, the local surface features constituting the three-dimensional shape model are projected onto the range image, based on the approximate position and orientation of the object and the corrected internal parameters of the range image capturing device 50. Then, the distance points on the range image that correspond to the projected local surface features are stored as the three-dimensional points that correspond to the surfaces.

Step S1130

The position and orientation obtaining unit 130 associates edges in the grayscale image with the three-dimensional shape model. Similar to step S1120, the local line features constituting the three-dimensional shape model are projected onto the grayscale image, based on the approximate position and orientation of the respective objects and the corrected internal parameters of the two-dimensional image capturing device 40, and the edges detected in the grayscale image are associated with the local line features in the three-dimensional shape model. If a plurality of edges that correspond to the respective local line features are detected, the edge of the detected plurality of edges that is closest in the image is associated with the projected local line features.

Step S1140

Based on the three-dimensional points in the range image that were calculated in step S1120 and correspond to the respective surfaces of the three-dimensional shape model, and the pieces of correspondence edge data in the grayscale image that was detected in step S1130 and corresponds to the respective line segments of the three-dimensional shape model, the position and orientation obtaining unit 130 calculates positions and orientations of the attachment destination part 20 and the attachment part 10. In this step, the positions and orientations are updated by solving linear simultaneous equations based on the calculated correspondence data so that the error between the measured data and the three-dimensional shape model is the smallest.

Here, a distance in an image and a distance in a three-dimensional space have different scales, and thus simply solving the simultaneous equation may result in the contribution ratio deviating to one of the types of measured data. Accordingly, in the present embodiment, a position and orientation is obtained with the distances having the same scale as a result of optimization based on the maximum likelihood estimation as disclosed in TATENO, KOTAKE, and UCHIYAMA, "A Model Fitting Method Using Intensity and Range Images for Bin-Picking Applications" D, Vol. J94-D(8), pp. 1410-1422, 2011.

The position and orientation obtaining method based on the maximum likelihood estimation is not relevant to the essence of the present invention, and thus detailed description thereof is omitted. Note that the method for obtaining a position and orientation of a measurement target object is not limited to the above-described method based on the maximum likelihood estimation, and repeated operations based on, for example, a Levenberg-Marquardt method may be performed, or a steepest descent method, which is a simpler method, may be performed. Alternatively, other nonlinear optimization calculation methods such as a conjugate gradient method and an ICCG method may be used.

Step S1150

The position and orientation obtaining unit 130 determines whether or not the position and orientation updated in step S1140 are convergent, that is, whether or not iterative calculation is further needed. Specifically, if the correction value is almost zero, or a difference between the pre- and post-correction square sums of an error vector is almost zero, it is determined that the updated position and orientation are convergent. If the updated position and orientation are not convergent (No, in step S1150), the procedure returns to step S1120, and the position and orientation estimation processing is again performed based on the updated position and orientation. If it is determined that the updated position and orientation are convergent (Yes, in step S1150), the processing ends, and a final estimation value of the relative position and orientation between the image capturing device and the assembled component 30 is determined. The processing of FIG. 5 ends therewith, and the procedure returns to FIG. 4.

Step S1200

The success/failure determination unit 150 determines whether or not assembly was successful based on the three-dimensional shape model, the position and orientation obtained in step S1100, and the range image. A result of the determination that was performed by the success/failure determination unit 150 is output via a display unit (not shown) or the like. The output method is not limited to display, and any method may be used as long as it is a method in which notification of a result can be performed via a light emitting unit, a sound source, or the like. The components such as the display unit, the light emitting unit, or the sound source may be provided on the information processing apparatus 1 or on another external apparatus that is separate from the information processing apparatus 1. The following will describe the processing in step S1200 for determining whether or not assembly was successful in detail with reference to the flowchart of FIG. 6.

Step S1210

Figure 6:
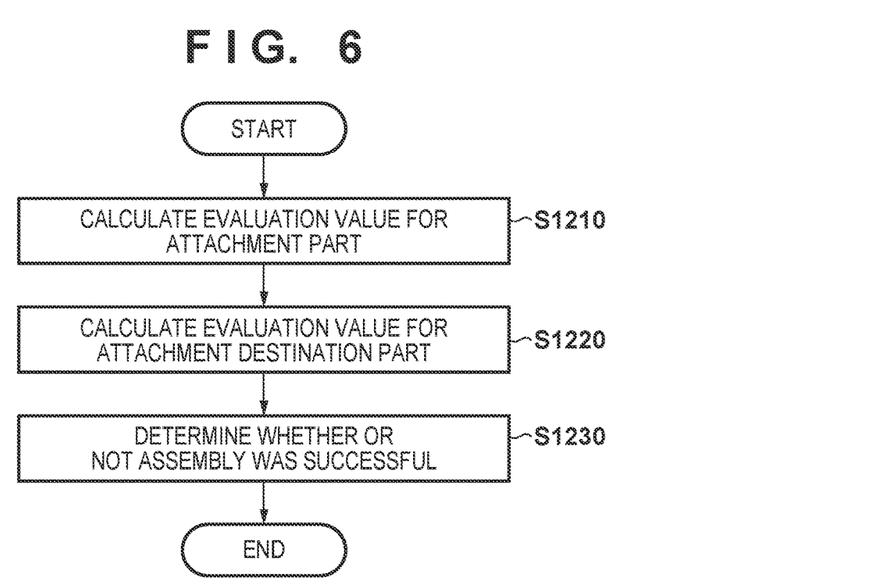
FIG. 6 is a flowchart illustrating a detailed procedure of the processing for determining whether or not assembly was successful, the processing being executed by the information processing apparatus according to the first embodiment.

First, the evaluation value obtaining unit 140 references local surface features in the three-dimensional shape model that belong to the attachment part 10, calculates residual errors between the surfaces and the three-dimensional points in the range image, and calculates an average value of the residual errors as an evaluation value for the attachment part 10.

Step S1220

Then, the evaluation value obtaining unit 140 references local surface features in the three-dimensional shape model that belong to the attachment destination part 20, calculates residual errors between the surfaces and the three-dimensional points in the range image, and calculates an average value of the residual errors as an evaluation value for the attachment destination part 20.

Step S1230

The success/failure determination unit 150 determines whether or not assembly was successful based on the evaluation value for the attachment part 10 that was calculated in step S1210, and the evaluation value for the attachment destination part 20 that was calculated in step S1220. Specifically, the success/failure determination unit 150 compares the evaluation value for the attachment destination part 20 and the evaluation value for the attachment part 10 with predetermined thresholds. A method for setting thresholds will be described later, but a threshold may be used in common for the two evaluation values, or different thresholds may be set for the evaluation values.

Here, if at least one of the two evaluation values exceeds the predetermined threshold, it is determined that assembly was not successful. In contrast, if both of the two evaluation values are equal to or less than the predetermined threshold, it is determined that assembly was successful.

Note that the threshold is set in advance. Specifically, for example, a successfully assembled component image in which the correctly assembled attachment destination part 20 and attachment part 10 are captured is prepared. Then, the procedure from step S1000 to step S1200 is performed on the successfully assembled component image, and the evaluation value for the attachment part 10 and the evaluation value for the attachment destination part 20 that are calculated with respect to the successfully assembled component image are set as the thresholds. At that time, it is also possible that, instead of the calculated evaluation values being directly used as the thresholds, certain biases are added to the calculated evaluation values to adjust the precision of determining whether or not assembly was successful. Alternatively, an arbitrary threshold may be set manually by a user, or by using another method.

As described above, in the present embodiment, an attribute that corresponds to the attachment destination part or an attribute that corresponds to the attachment part is added in advance to each area of a three-dimensional shape model of an assembled component, assembly evaluation values that correspond to the respective attributes are calculated, and it is determined whether or not assembly was successful based on the evaluation values.

Accordingly, it is possible to detect a mismatch between a captured image and at least one of the attachment destination part and the attachment part, making it possible to accurately determine whether or not assembly was successful without setting a target area, while eliminating the influence of the relative dimensions, shapes, the observation view points of the two parts constituting an assembled component, and the like.

Note that although, in the present embodiment, an average value of the local surface features is used as an evaluation value calculated by the evaluation value obtaining unit 140, a median value may be used, or a histogram may be used based on residual errors calculated with respect to the local surface features and a mode value of the histogram may be used. Furthermore, in the present embodiment, local surface features are used to calculate residual errors between surfaces and three-dimensional points, but local line features may be used. Furthermore, residual errors for use in calculating the assembly evaluation values, and the amount of statistics thereof may be calculated by any method without being particularly limited, as long as it is a method in which a difference between a three-dimensional shape model and a captured image can be detected.

Modification 1-1

The above-described embodiment has described an example in which an assembled component constituted by two parts is subjected to determination of whether or not assembly was successful. However, a similar determination method may also be applicable to a case where an assembled component constituted by three or more parts is subjected to determination of whether or not assembly was successful. Also in this case, attributes that correspond to the parts constituting the assembled component are added in advance to the shapes of the parts in the three-dimensional shape model of the assembled component. Then, evaluation values for the areas that correspond to the respective attributes are calculated based on the attributes of the three-dimensional shape model.

If at least one of the constituent parts has an evaluation value that is larger than a threshold, it is determined that assembly was not successful, otherwise, it is determined that assembly was successful. Accordingly, also in the case of an assembled component that is constituted by three or more parts, it is possible to accurately determine whether or not the assembly was successful without setting a target area.

Second Embodiment

The first embodiment described the method for determining, with respect to an assembled component constituted by a plurality of parts, whether or not the assembly was successful. In contrast, the present embodiment will describe a case in which an image of a component (held component) held by a robot hand is captured by an image capturing device attached to the hand, and it is determined whether or not holding was successful. Note that it is also possible that the image capturing device is not attached to the hand, and is fixed to and arranged within a movement range of the robot. Here, an example will be described in which a position and orientation is stably calculated without being affected due to the image capturing device being hidden by the hand.

Figure 7:
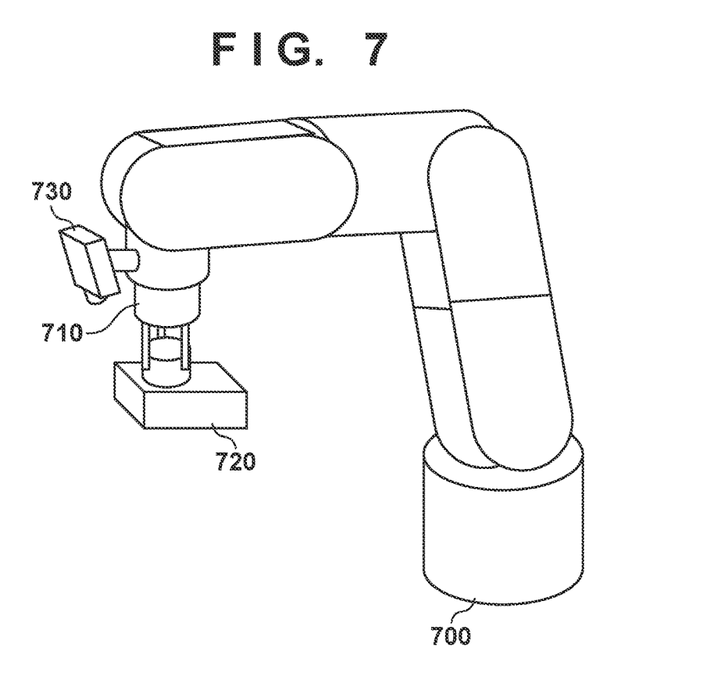
FIG. 7 is a diagram illustrating an example of a configuration of a robot system according to a second embodiment.

As shown by the example shown in FIG. 7, it is conceivable that a robot hand 710 is attached at the front end of a robot arm 700, a held component 720 held by the robot hand 710 is captured by an image capturing device 730 attached to the robot hand, and whether or not the holding was successful is determined.

The present embodiment employs a three-dimensional shape model of an assembly of the robot hand 710 and the held component 720 in a state in which the held component 720 is correctly held by the robot hand 710 (hereinafter, referred to as "held three-dimensional shape model"). It is assumed here that attributes that can distinguish between areas that correspond to the robot hand 710 and areas that correspond to the held component 720 are added in advance to the held three-dimensional shape model. This held three-dimensional shape model is regarded as the three-dimensional shape model of the assembled component 30 in the first embodiment, and the same processing as that of the first embodiment is executed.

In other words, on the assumption that the robot hand 710 and the held component 720 in the state of being held by the robot hand 710 are regarded as one body, a position and orientation thereof is calculated using a captured image of the one body, and then residual errors from the captured image are obtained based on the areas of the held three-dimensional shape model that correspond to the respective attributes. If any of the areas that correspond to the robot hand 710 or the areas that correspond to the held component 720 has a large residual error, it is determined that the holding was not successful, otherwise, it is determined that holding was successful.

According to the present embodiment, it is possible to accurately determine whether or not parts are successfully held by a robot hand, without setting a target area.

According to the present invention, it is possible to improve the accuracy in determining whether or not assembly was successful without setting a target area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-026347, filed Feb. 15, 2016, which is hereby incorporated by reference herein in its entirety.

What is claimed is:

1. An information processing apparatus comprising:
one or more processors; and
a memory coupled to the one or more processors, the memory having stored thereon instructions which, when executed by the one or more processors, cause the apparatus to:
   obtain an image of an assembled object that is constituted by a first object and a second object that have been assembled;
   obtain a three-dimensional shape model of the assembled object that has at least one first area that corresponds to the first object and at least one second area that corresponds to the second object;
   obtain a position and orientation of the assembled object based on the image;
   obtain, from the three-dimensional shape model of the assembled object corresponding to the obtained position and orientation, a first evaluation value that is for evaluating a state of assembly in the at least one first area, and a second evaluation value that is for evaluating a state of assembly in the at least one second area; and
   determine whether or not the assembly was successful based on the first evaluation value and the second evaluation value.

2. The information processing apparatus according to claim 1, wherein the instructions, when executed by the one or more processors, further cause information processing apparatus to determine that the assembly was successful if both of the first evaluation value and the second evaluation value are equal to or less than a threshold.

3. The information processing apparatus according to claim 1, wherein the instructions, when executed by the one or more processors, further cause information processing apparatus to determine that the assembly was not successful if at least one of the first evaluation value and the second evaluation value exceeds the threshold.

4. The information processing apparatus according to claim 1, wherein the instructions, when executed by the one or more processors, further cause information processing apparatus to:
   obtain the first evaluation value based on first residual errors that are obtained from the image, and from a geometric feature in the area of the three-dimensional shape model of the position and orientation that corresponds to the first object; and
   obtain the second evaluation value based on second residual errors that are obtained from the image, and from a geometric feature in the area of the three-dimensional shape model of the position and orientation that corresponds to the second object.

5. The information processing apparatus according to claim 4,
   wherein the first evaluation value is an average value or a median value of the first residual errors, or a mode value that is obtained from a histogram of the first residual errors.

6. The information processing apparatus according to claim 4,
   wherein the second evaluation value is an average value or a median value of the second residual errors, or a mode value that is obtained from a histogram of the second residual errors.

7. The information processing apparatus according to claim 4,
   wherein the geometric feature is either of a local surface feature and a local line feature that constitute the three-dimensional shape model.

8. The information processing apparatus according to claim 1, wherein the instructions, when executed by the one or more processors, further cause information processing apparatus to output a result of the determination.

9. The information processing apparatus according to claim 1,
   wherein the image includes at least one of a grayscale image and a range image.

10. A control method of an information processing apparatus, comprising:
    obtaining an image of an assembled object that is constituted by a first object and a second object that have been assembled;
    obtaining a three-dimensional shape model of the assembled object that has at least one first area that corresponds to the first object and at least one second area that corresponds to the second object;
    obtaining a position and orientation of the assembled object based on the image;
    obtaining, from the three-dimensional shape model of the assembled object corresponding to the obtained position and orientation, a first evaluation value that is for evaluating a state of assembly in the at least one first area, and a second evaluation value that is for evaluating a state of assembly in the at least one second area that corresponds to the second object; and
    determining whether or not the assembly was successful based on the first evaluation value and the second evaluation value.

11. A non-transitory computer-readable storage medium storing a computer program for causing a computer to execute a control method of an information processing apparatus, the control method comprising:
    obtaining an image of an assembled object that is constituted by a first object and a second object that have been assembled;
    obtaining a three-dimensional shape model of the assembled object that has at least one first area that corresponds to the first object and at least one second area that corresponds to the second object;
    obtaining a position and orientation of the assembled object based on the image;
    obtaining, from the three-dimensional shape model of the assembled object corresponding to the obtained position and orientation, a first evaluation value that is for evaluating a state of assembly in the at least one first area, and a second evaluation value that is for evaluating a state of assembly in the at least one second area; and
    determining whether or not the assembly was successful based on the first evaluation value and the second evaluation value.

* * * * *